United States Patent
Bucella et al.

(10) Patent No.: US 7,911,352 B2
(45) Date of Patent: Mar. 22, 2011

(54) METHOD AND APPARATUS FOR PROTECTION OF AC-DC POWER CONVERTERS

(75) Inventors: Thomas John Bucella, Rochester, NY (US); Thomas P. Dombroski, Fairport, NY (US); David E. Fuchs, Pittsford, NY (US); Jeremy M. Block, Walworth, NY (US)

(73) Assignee: Teknic, Inc., Pittsford, NY (US)

( * ) Notice: Subject to any disclaimer, the term of this patent is extended or adjusted under 35 U.S.C. 154(b) by 360 days.

(21) Appl. No.: 12/273,226

(22) Filed: Nov. 18, 2008

(65) Prior Publication Data

US 2009/0128347 A1    May 21, 2009

Related U.S. Application Data

(60) Provisional application No. 60/988,947, filed on Nov. 19, 2007.

(51) Int. Cl.
*G08B 21/00* (2006.01)

(52) U.S. Cl. ........ 340/654; 340/635; 340/657; 340/664; 323/205; 323/208; 323/210; 361/18; 361/20; 361/23; 361/111; 363/56.09; 363/80

(58) Field of Classification Search ............... 340/654, 340/635, 657, 664; 361/18, 20, 23, 111; 363/56.09, 80; 323/205, 208, 210
See application file for complete search history.

(56) References Cited

U.S. PATENT DOCUMENTS

| 4,333,049 | A |   | 6/1982  | Yui et al.      |         |
|-----------|---|---|---------|-----------------|---------|
| 4,843,533 | A |   | 6/1989  | Roof et al.     |         |
| 5,127,085 | A |   | 6/1992  | Becker et al.   |         |
| 5,465,011 | A | * | 11/1995 | Miller et al.   | 307/64  |
| 5,491,624 | A | * | 2/1996  | Levran et al.   | 363/87  |
| 5,574,632 | A |   | 11/1996 | Pansier         |         |
| 5,615,097 | A |   | 3/1997  | Cross           |         |
| 5,619,127 | A |   | 4/1997  | Warizaya        |         |
| 5,715,154 | A |   | 2/1998  | Rault           |         |
| 5,920,186 | A |   | 7/1999  | Ninh et al.     |         |
| 7,113,380 | B2|   | 9/2006  | Youm            |         |

FOREIGN PATENT DOCUMENTS

JP    04-017517 A    1/1992
KR    10-2006-0090127 A    8/2006

OTHER PUBLICATIONS

International Search Report and Written Opinion for International Application No. PCT/US2008/083953. Issued Jun. 24, 2009.
International Search Report and Written Opinion for International Application No. PCT/US2008/088513. Issued Jul. 30, 2009.

* cited by examiner

*Primary Examiner* — Tai T Nguyen
(74) *Attorney, Agent, or Firm* — Brown & Michaels, PC (57) ABSTRACT

An AC-DC power converter controls an external upstream switching device, which supplies it power to be converted. Power conversion is initiated when an external signal requests power be converted or when a program within the AC-DC power converter detects the need for power conversion. When this occurs, the AC-DC power converter signals the external switching device, which is upstream of the AC-DC power converter to turn on, thereby supplying the power to be converted to the AC-DC power converter.

33 Claims, 4 Drawing Sheets

METHOD AND APPARATUS FOR PROTECTION OF AC-DC POWER CONVERTERS

REFERENCE TO RELATED APPLICATIONS

This application claims one or more inventions which were disclosed in Provisional Application No. 60/988,947, filed Nov. 19, 2007, entitled "Method and Apparatus for Protection of AC-DC power Converters". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of AC-DC power converters. More particularly, the invention pertains to protection of such converters.

2. Description of Related Art

Electrical and electromechanical machines often include AC-DC power converters that convert incoming AC power to another type of power for use by devices (loads). Examples of power conversion include AC to DC rectifiers, voltage step-down converters, voltage step-up converters. Often, the AC power supplied to and/or the DC power produced by the AC-DC Power Converter is considered hazardous to humans and/or supplies loads that are hazardous to humans (Hazardous).

There is a need to protect the AC-DC Power Converters and their loads from connection to the wrong type of power, incorrect power connections, poor power quality, wiring shorts and overloads. When the power or load is Hazardous, there is also a need to insure that the power to the power converter is securely disconnected when a safety event (e.g., emergency stop) or a safety lockout occurs.

Today, upstream protection devices used to protect AC-DC power converters e.g., circuit breakers, fuses, etc. operate independently from the AC-DC power converter. As such, these upstream devices are generally limited in their functionality because they are unaware of the effect of the incoming power on the AC-DC power converter and their loads. In addition, when the power is Hazardous, a safety-switching device and controller are often used to ensure safety in a machine by securely disconnecting power to the AC-DC power converter. In both of these examples more protection, seamless power sequencing and other added functions can be accomplished if the AC-DC power converter is responsible for controlling an upstream switching device for these protection functions.

SUMMARY OF THE INVENTION

An AC-DC power converter controls an external upstream switching device, which supplies it power to be converted. Power conversion is initiated when an external signal requests power be converted or when a program within the AC-DC power converter detects the need for power conversion. When this occurs, the AC-DC power converter signals the external switching device, which is upstream of the AC-DC power converter to turn on, thereby supplying the power to be converted to the AC-DC power converter.

DETAILED DESCRIPTION OF THE INVENTION

In this invention the AC-DC power converter monitors the external upstream switching device either by qualifying that the power is, or is not, being supplied, or alternately, it may monitor the state of the external upstream switching device by an auxiliary means. Most often, and in our preferred embodiment, the external upstream switching device is an electrical contactor and the state of the device is monitored by detecting the presence of the AC power between phase inputs at the AC-DC power converter, by detecting the presence of AC voltage between at least one AC input terminal and earth ground, and/or by auxiliary contacts on the electrical contactor.

If the AC-DC power converter detects that the connected power is inappropriate, e.g., too high or too low in voltage, single phase as opposed to three phase, incorrect frequency, etc., it may elect to turn off the external upstream switching device to protect the AC-DC power converter and/or the downstream circuits (loads).

The AC-DC power converter can optionally elect to turn off the upstream external upstream switching device if the incoming power is of insufficient quality to support the requirements for the power to be delivered by the AC-DC power converter.

Another important element of the invention is to react when it has commanded the external upstream switching device to disconnect power and it detects that this has failed (or partially failed, i.e. disconnected only a portion of the incoming power circuits). When this occurs, it may do one or more of the following: sound an alarm, send a "safety breach" signal to other devices or, engage other means of rendering the output of the power converter safe, e.g., shorting the input or output of the power converter to blow upstream circuit protection devices, stopping the power conversion process, or, by using some supplemental power disconnect method internal to the Power Converter.

A Specific Embodiment

AC-DC Rectifier

Figure 1:
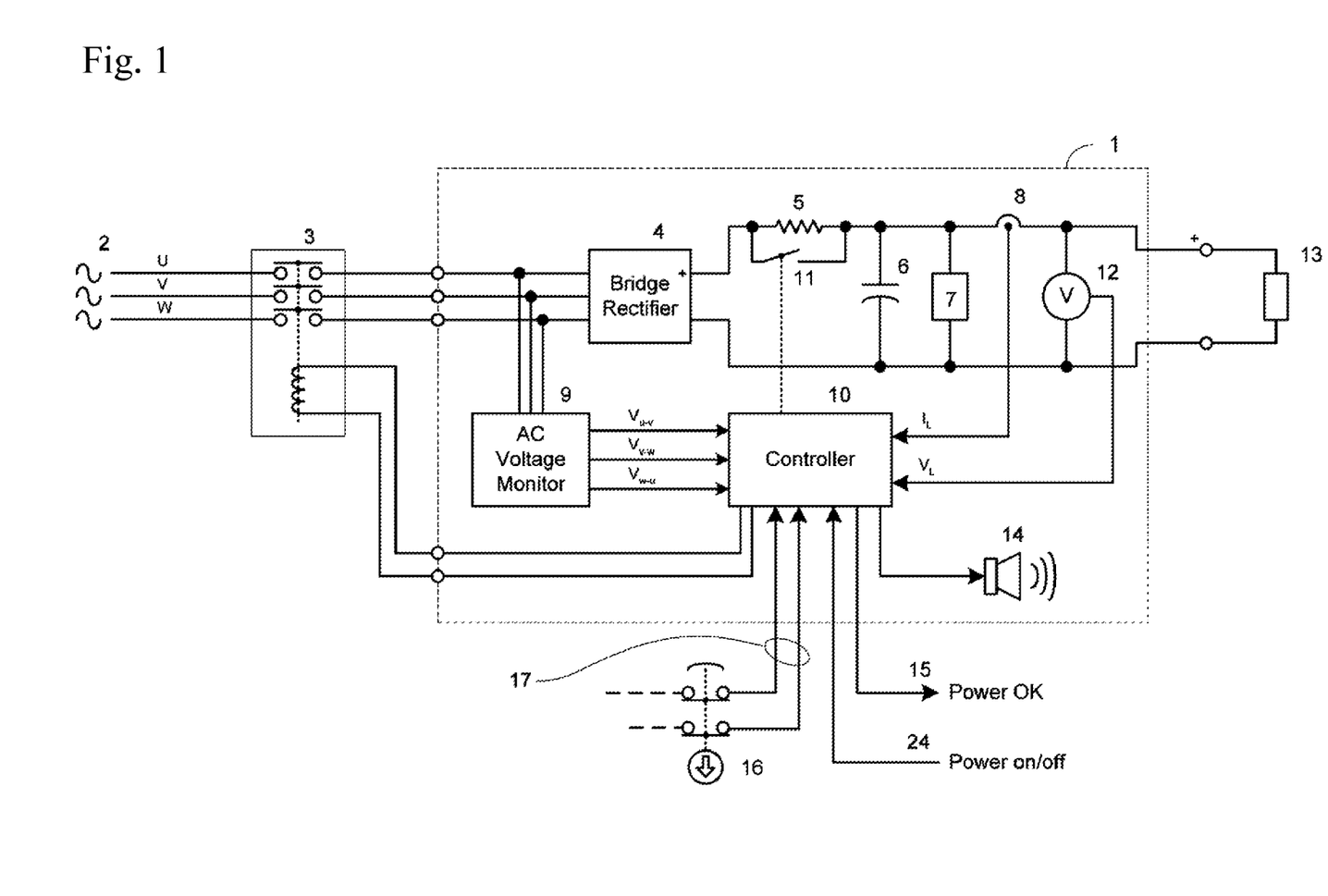
FIG. 1 shows a block diagram of the invention
Figure 3:
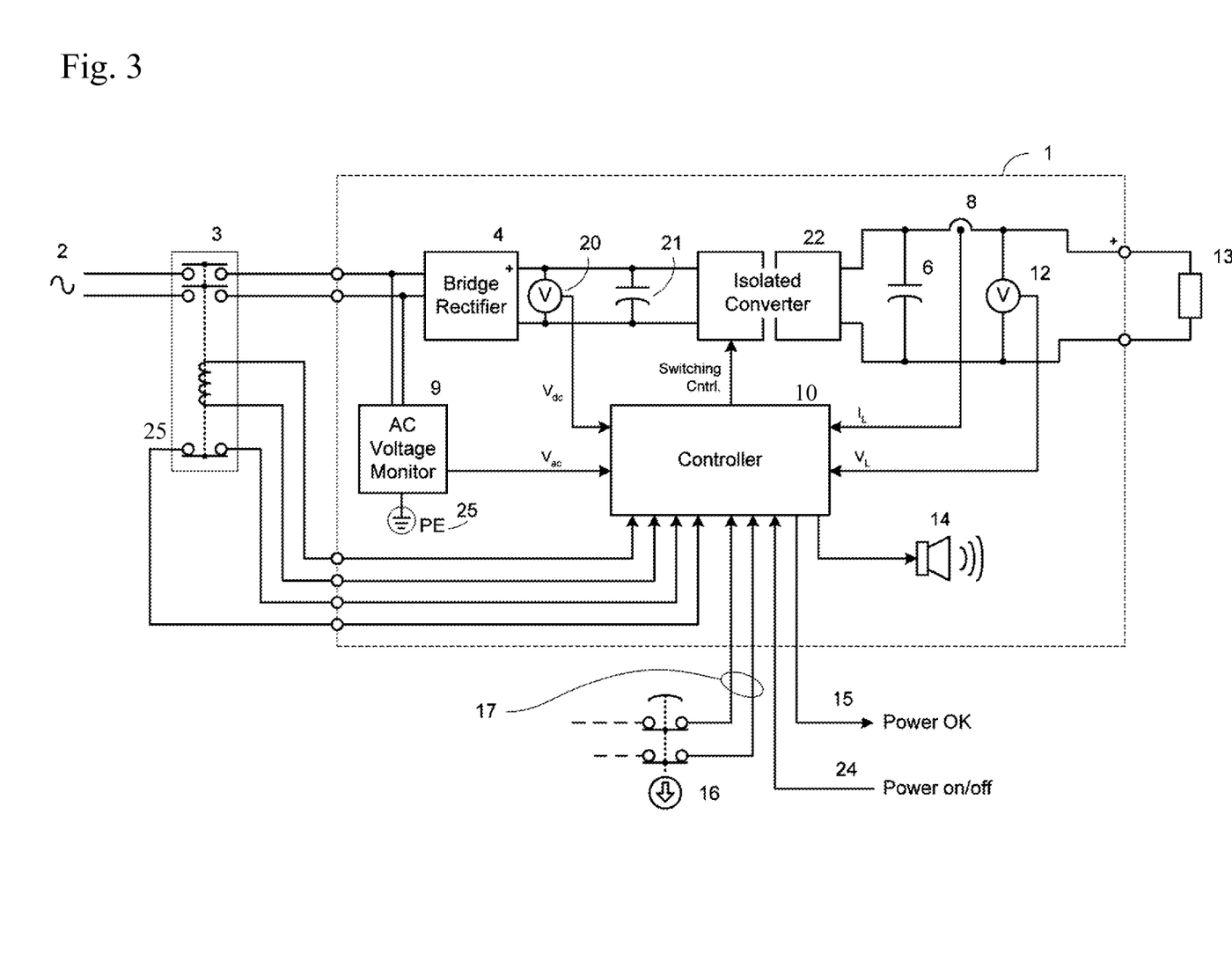
FIG. 3 shows a block diagram of another embodiment of the invention using an isolated converter

FIG. 1 illustrates an AC-DC rectifier implementation that uses many of the novel concepts of the invention. An AC power source (2) which may be single phase (as shown in FIG. 3) or multiple phase (as shown in FIG. 1) is routed through an external upstream switching device (3) to the AC-DC rectifier device (1). The external switching device (3) may be a mechanical relay as shown schematically in the figures, or a solid-state relay or switch or triac/SCR, or another power control device known to the art in which the input power is connected to and disconnected from a power output in response to a control input.

Upon receipt of a power-on command through the input command signal (24) the controller (10) will turn on the external switching device (3). Through an AC monitoring circuit (9), the controller (10) checks the quality of AC voltage supplied at the output of the switching device. If there are problems detected with the incoming AC supply the controller (10) turns off the external switching device.

The AC from the external switching device (3) is rectified into DC by a rectifier, preferably a bridge rectifier (4), but which could be any sort of AC-DC rectifier circuit known to the art, including a power factor corrected (PFC) rectifier circuit.

The DC output of the rectifier is coupled to a protective circuit which is controllable so that the output of the protective circuit can be controlled by an input to protect the DC supply to the load (13). In FIG. 1, this is shown as protective impedance (5), which can either reduce the DC current and voltage when the impedance is in line, or be bypassed by bypass (11) to provide the full output of the rectifier (4) through a load port to the load (13).

The AC monitor (9), bridge rectifier (4), protective impedance (5) and protective impedance bypass (11) are rated to withstand voltages in excess of the rating of the AC-DC rectifier device (1). This allows the temporary connection to an AC source (2) which is in excess of the voltage ratings of the AC-DC rectifier device (1).

The protective impedance bypass (11) is only actuated when the controller (10) has determined it is safe to connect the output of the rectifier to the load. This can be done by detecting that the AC input voltage is appropriate (e.g. below the maximum rated voltage of the AC-DC rectifier device (1)) using the AC voltage monitor (9) and, optionally, by monitoring the charging of the filter capacitor (6) through the DC voltage monitor (12). By monitoring the time history of the capacitor's (6) voltage when being charged by the impedance (5) the controller (10) can calculate the asymptotic limit (final value) of the capacitor voltage before the charging is complete so it can take action before the voltage exceeds the limits of the load (13), capacitor (6) or the other sensitive circuits (7). This can be less expensive than measuring the AC input directly.

The provision of DC monitor (12) also allows the controller (10) to shut off the external switching device (3) when the output voltage exceeds a determined value, before damaging the circuits rated at lower voltages: the filter capacitor (6), the external load (13) and other sensitive circuits (7) that would be damaged by excessive voltage. It should be noted that this capability allows the invention to protect more than just the load (13) and the capacitor (6)—a typical embodiment might have other circuits or devices with voltage limits.

The controller may also monitor the DC output current in the load through the current sensor (8) If this function is employed, the controller (10) will disconnect the AC power source (2) with the external switching device (3) if the DC output current exceeds a determined value such as a maximum current rating of the AC-DC rectifier or the rating of the load (13), whichever is smaller.

If at any time the controller (10) attempts to turn-off the external switching device (3) and then detects that the external switching device has not disconnected all or some of the connections to the AC source (2), it may sound an alarm through annunciator (14). The controller (10) detects the failure of the external switching device to disconnect using the AC voltage monitor (9) or by monitoring the external-switching device through auxiliary sensing means (not shown).

The controller (10) may have a "power-OK" output (15) on which it asserts a signal when it determines that power quality is acceptable. This output may be coupled to a load so that the load device can react to problems in power quality. A safety switch (16) can be provided, which asserts a status signal (17) coupled to an input of the controller, by which an operator can indicate "Operate", or, alternatively, "Stop" or "Faulted".

The controller (10) may delay the turn-on of the external switching device (3) in order to limit the heating of internal components or components within the load from start-up currents in the system that could over stress components if the input command signal (24) is cycled too rapidly.

After receipt of a "power off" command on the power on/off input (24), the controller (10) may also first de-assert the power-OK signal (15) and delay turning off the external switching device (3) for a selected time, in order to allow the load time to react to de-assertion of the power-OK signal (15).

A Specific Embodiment

Isolated AC-DC Converter

FIG. 3 illustrates an isolated AC-DC converter implementation that uses many of the concepts detailed above. Where the elements in this embodiment are the same as in the embodiment of FIG. 1, the elements will not be discussed in detail here. Such elements will have the same reference numbers in FIGS. 1 and 3.

As in FIG. 1, an AC power source (2) is routed through an external switching device (3) to the AC-DC converter device (1). In this figure, the supply is shown as single-phase, but once again it will be understood that the AC supply might by any form of supply known to the art, single- or multi-phase, within the teachings of the invention.

Instead of the protective impedance (5) and bypass (11) used in FIG. 1, the protective circuit in the embodiment of FIG. 3 is an isolated converter (22) which controls the flow of power from the rectifier (4) to the load (13). The "isolated converter" is a DC-DC converter that uses an energy transfer method/mechanism which is galvanically isolated between its input and output circuits; most often this is accomplished via a magnetic transformer. A fuller name for such a converter would be an "isolated switching converter" which someone skilled in the art would understand.

The embodiment of FIG. 3 also has a rectified DC monitor (20) coupled to the output of the rectifier (4), which has an output coupled to an input of the controller (10). This allows the controller to detect problems detected with the incoming AC supply or with the rectifier (4) which show up in the DC output of the rectifier (4). The controller (10) can then turn off the external switching device (3) or de-activate the isolated converter (22), or both, to protect the isolated converter (22) and the load (13).

The embodiment of FIG. 3 also has an input capacitor (21) on the output of the bridge rectifier (4). The DC monitor (20) can monitor the charging of the capacitor (21), as described in the embodiment of FIG. 1, above, and the controller (10) can then shut off the external switching device (3) if problems are detected, before any such problem can damage the isolated converter stage (20).

The switching device (3) shown in FIG. 3 has a status indicator in the form of an additional set of contacts (25) coupled to an input of the controller (10). This allows the controller (10) to detect the status of the switching device (3) and detect problems with the circuitry of the converter. For example, if the controller (10) commands "power on" or "power off", and the contacts (25) do not close or open accordingly, this could indicate failure of the controller output or physical failure of the switching device (3), or a short circuit and/or interruption of the wires connecting the converter (1) and the switching device (3). The controller (10) can then sound an alarm (14) or switch the protective circuit (22) as desired if the status of the switching device (3) does not match the expected status based on the state of the controller output.

If at any time the controller (10) attempts to turn-off the external switching device (3) and then detects that the external switching device has not disconnected all or some of the connections to the AC source (2) by the AC voltage monitor (9), the additional contacts (25), or by monitoring the external-switching device through any other auxiliary sensing means known to the art, it may sound an alarm through annunciator (14) and/or stop the operation of the isolated converter stage (22).

The "PE" symbol shown in the diagram (25) is the international symbol for Protective Earth Ground, which can be used as a reference node by the AC voltage monitor (9) circuit to measure the presence of a Hazardous AC input even when only one phase is accidentally connected (e.g., from a contact failing to open on contactor (3)).

Flowchart of Operation

Figure 2A:
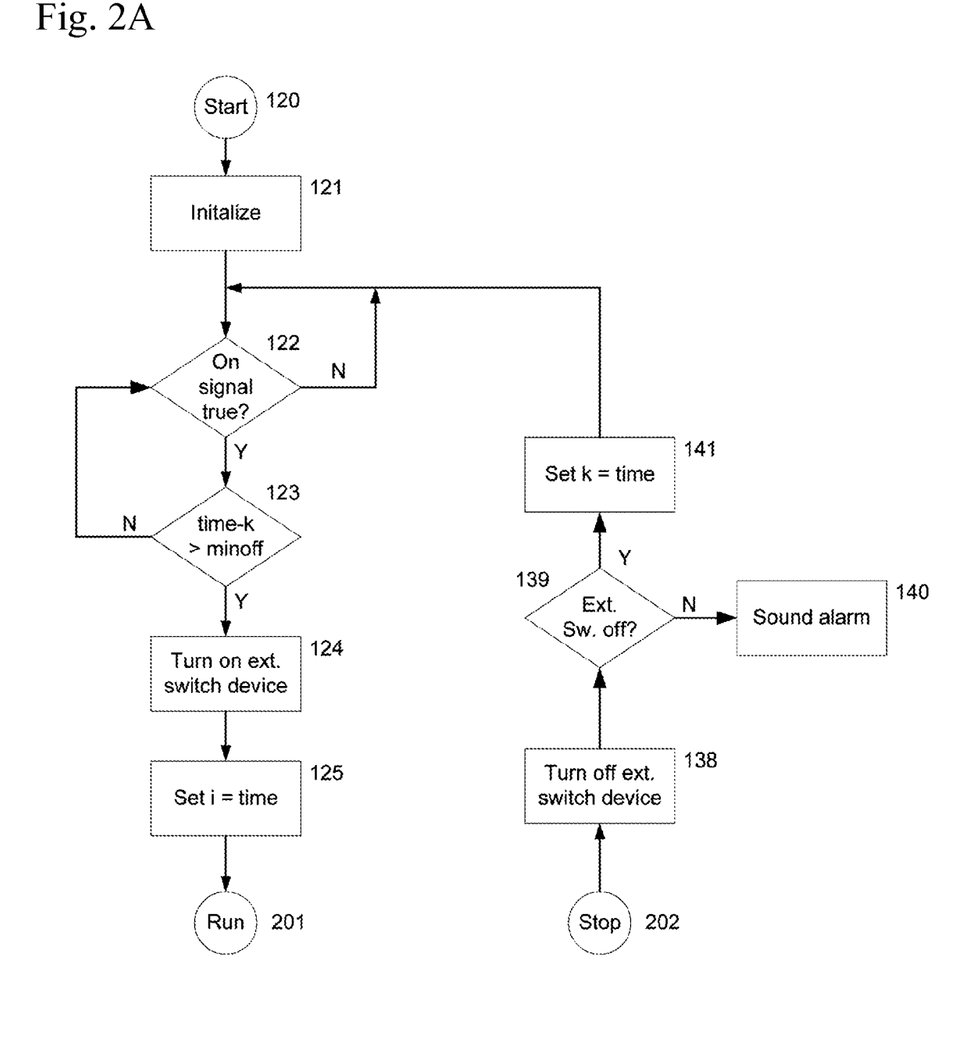
FIG. 2 shows a flowchart of the operation of the invention. The figure is broken into two sheets, labeled as 2A and 2B.
Figure 2B:
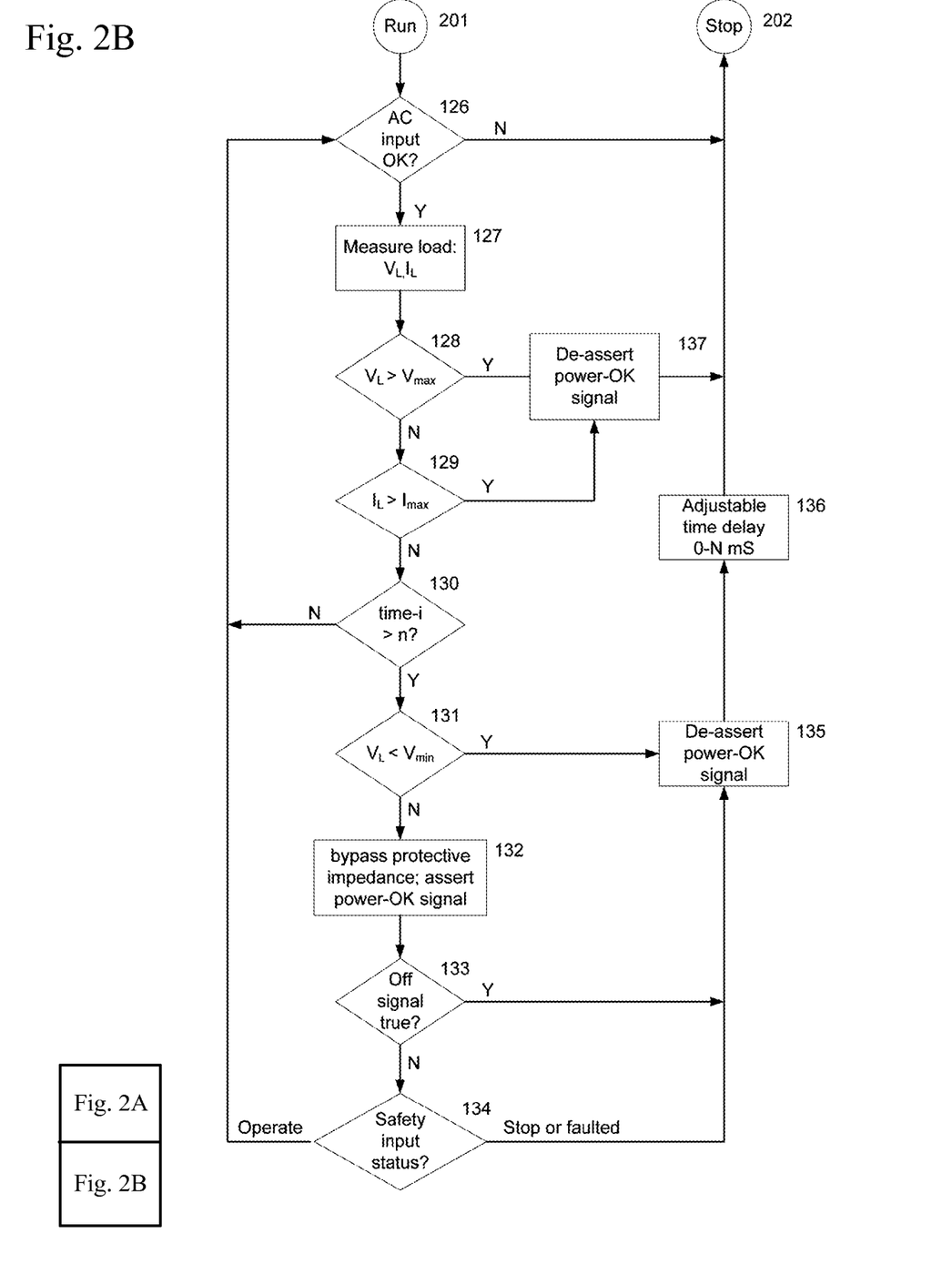

One example method that utilizes the apparatus elements to accomplish the functions outlined above is diagramed in the flowchart FIG. 2.

Of the variables referenced in the flowchart, "time" is a continuously rolling count incremented on a precision periodic basis, e.g., every millisecond. "minoff" is a constant that is shortest allowable time between cycling the external upstream switching device off and then on again; "n" is a constant that is the time allowed to qualify the incoming power (in "time" units); "i" is the variable used to hold the time of the most recent turn-on of the external upstream switching device; "k" is the variable used to hold the time of the most recent turn-off of the external upstream switching device.

Step 120: The method starts
Step 121: The apparatus is initialized
Step 122: The method loops to wait until it receives an "ON" signal (24)
Step 123: Compare—is time-k>minoff? This step protects against cycling the upstream equipment too quickly. In other words, has the minimum allowable "off" time elapsed, so that the upstream device may now be cycled back on again? If it is not true, then the method loops back to step 122.
Step 124: Turn on external switch device (3)
Step 125: Store the most recent turn-on time (set i=time).
Step 126: Check—is the AC input OK?
  If it is OK, proceed to step 127
  If it is not OK, then proceed to step 138
Step 127: Measure the load: $V_L, I_L$
Step 128: Check the load voltage—does it exceed a limit voltage ($V_L > V_{max}$)?
  If it does exceed the limit, skip to step 137
Step 129: Check the load current—does it exceed a limit current ($I_L > I_{max}$)?
  If it does exceed the limit, skip to step 137
Step 130: Has the method allowed enough time for the incoming power to be qualified?
  Check the time—is time-i>n?
  If it is not, loop back to step 126
Step 131: Check for undervoltage—is the load voltage less than a minimum ($V_L < V_{min}$)?
  If it is less than the minimum, skip to step 135
Step 132: Activate the protective impedance (5) bypass (11); and assert the "power-OK" signal (24)
Step 133: Check to see if the "Off signal" (24) is true
  If it is, skip to step 135
Step 134: Check the safety input status (17)
  If the status is "Operate", loop back to step 126
  If the status is "Stop" or "Faulted", continue to step 135
Step 135: De-assert the "Power-OK" signal (24)
Step 136: After an adjustable time delay, skip to step 138
Step 137: De-assert the "Power-OK" signal (24)
Step 138: Turn off the external switching device
Step 139: Check to see if the external switch really is off.
  If it is not, Step 140 Sound an Alarm (14), otherwise proceed to step 141
Step 141: Store the most recent turn off time (set k=time), and loop back to step 122

It will be understood that this is given merely as an example of a method of operation appropriate for the invention, but that other variations and substitutions are possible within the teachings of the invention.

There are no commercial examples of AC-DC power converters (DC output power supplies, rectifiers, etc) that control both the on and off actuation of an external upstream switching devices, i.e., AC-DC power converters that control the supply power to them. Such a converter would control the on and off actuation of the external upstream switching device based upon control signaling to the AC-DC power converter. It would autonomously be able to shut off the external upstream switching device in exception circumstances and/or time the exact on or off switching of the external upstream switching device to enhance the operation of the system it is in.

In summary, then, the features of the invention which are believed to be novel are as follows:

1. After the AC-DC converter turns on the external switching device in response to an external signal, the AC-DC converter will autonomously shut off the external switching device if and when it detects that the continued application of power would damage the AC-DC converter unit or the power converter's load(s).
2. After the AC-DC converter turns on the external switching device in response to an external signal, the AC-DC converter will autonomously shut off the external switching device if and when it detects that the power source is insufficient to power the power load(s) connected to the converter.
3. After the AC-DC converter turns on the external switching device in response to an external signal, the AC-DC converter will autonomously shut off the external switching device if and when a short or overload is detected in the load(s).
4. The AC-DC converter will delay the turn-on of the upstream switching device (from a turn-on request of the external signal) until the power converter is ready to receive power (e.g. cooled down).
5. The AC-DC power converter, will turn-off the upstream switching device whenever a safety interlock circuit, which is connected to fault tolerant inputs of the AC-DC power converter, detects that a hazard to humans exist within a machine powered by the AC-DC power converter. The safety interlock circuit may contains one or more of the following safety monitoring devices: guard interlock switches, light curtains, pressure sensitive safety mats, laser scanner shields, emergency stop switches and emergency stop perimeter guarding cords, etc.
6. The AC-DC converter can autonomously delay the turn-off of the external switching device when a safety interlock circuit detects a that a hazard exists so that downstream load(s) have had enough notice to react to the impending power removal.
7. The AC-DC converter will autonomously shut off the external switching device if and when it detects a failure in the interlock circuit's wiring or the monitoring devices that are purposed to protect humans from the hazards presented by the AC-DC converter's load(s).

8. The AC-DC power converter, in addition to controlling the upstream switching device, also monitors the upstream switching device to ensure it is fully on or fully off, if this fails the AC-DC converter will signal an alarm condition.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An AC-DC converter having capability of controlling an upstream switching device having a power input, a power output, and a control input, the power input being coupled to and uncoupled from the power output in response to a status of the control input, the converter comprising:
   a) an AC monitor coupled to the power output of the switching device, having an output related to a quality of AC voltage on the power output of the switching device;
   b) a rectifier having an AC input coupled to the power output of the switching device, and a DC output;
   c) a load port coupled to the DC output of the rectifier, for connection of a DC load to the AC-DC converter
   d) a controller having an input coupled to the output of the AC monitor and an input coupled to a power on/off input; and an output coupled to the control input of the upstream switching device;
      the controller operating such that if the output of the AC monitor indicates a problem with the quality of the AC voltage, the controller causes the power output of the switching device to be uncoupled from the power input by controlling the output coupled to the control input of the switching device.

2. The converter of claim 1, further comprising a protective circuit having an input coupled to the DC out put of the rectifier, a control input coupled to an output of the controller, and an output coupled to the load port controlled by the control input; wherein if the controller determines that it is safe to connect the output of the rectifier to the load, the controller causes the DC output of the rectifier to be coupled to the output of the protective circuit by controlling the output coupled to the input of the protective circuit.

3. The converter of claim 2 in which the protective circuit comprises a protective impedance having a bypass coupled to the input of the protective circuit, such that DC current from the DC output of the rectifier passes through the impedance to the output of the protective circuit, and when the output of the controller coupled to the input of the protective circuit activates the bypass, the impedance is bypassed such that the DC output of the rectifier is coupled to the load without reduction by the impedance.

4. The converter of claim 2, in which the protective circuit is an isolated converter, and controller actuates isolated converter such that DC current from the DC output of the rectifier passes through the isolated converter when the output of the controller coupled to the input of the protective circuit is activated.

5. The converter of claim 1, further comprising a voltage sensor measuring a voltage at the output of the rectifier circuit output, having an output related to the measured voltage, coupled to an input on the controller.

6. The converter of claim 5, further comprising a filter capacitor across the output of the rectifier, in which the controller determines that it is safe to connect the output of the rectifier to the load based at least on a charging rate of the capacitor as measured by the voltage sensor.

7. The converter of claim 1, in which the controller determines that it is safe to connect the output of the rectifier to the load based at least on the output of the AC monitor.

8. The converter of claim 1, further comprising a current sensor between the output of the rectifier and the load port, having an output coupled to an input on the controller and related to the current drawn through the load port, in which the controller causes the power output of the switching device to be uncoupled from the power input if the current sensor detects a current in excess of a determined value by controlling the output coupled to the control input of the switching device which.

9. The converter of claim 1, further comprising a voltage monitor coupled to the load port, having an output coupled to an input on the controller related to the DC voltage at the load port.

10. The converter of claim 8, in which the controller causes the power output of the switching device to be uncoupled from the power input if the voltage monitor detects a voltage in excess of a determined value by controlling the output coupled to the control input of the switching device.

11. The converter of claim 1, further comprising a voltage sensor coupled to the DC output of the rectifier, having an output coupled to an input of the controller related to the voltage at the DC output of the rectifier, and in which the controller causes the power output of the switching device to be uncoupled from the power input if the voltage sensor detects a problem in the output of the rectifier by controlling the output coupled to the control input of the switching device.

12. The converter of claim 1, in which the controller detects a failure to disconnect the AC switching device if the controller controls the output coupled to the control input of the switching device to cause the power output of the switching device to be uncoupled from the power input, and the output of the AC monitor indicates the presence of an AC voltage at the input to the rectifier.

13. The converter of claim 1, in which the controller delays turn-on of the AC switching device to prevent damage if a signal at the power on/off input is cycled too rapidly.

14. The converter of claim 1 in which the converter has a power-OK signal output coupled to an output of the controller which is asserted if the controller has determined that it is safe to connect the output of the rectifier to the load and has successfully completed such connection.

15. The converter of claim 14, in which after receiving a power off signal on the power on/off input, the controller de-asserts the power-OK signal and then delays turning off the switching device for a selected time to allow a load to react to de-assertion of the power-OK signal.

16. The converter of claim 1, further comprising a safety switch coupled to an input of controller, in which the controller causes the power output of the switching device to be uncoupled from the power source in response to actuation of the safety switch by controlling the output coupled to the control input of the switching device.

17. The converter of claim 1, further comprising an annunciator coupled to an output of the controller.

18. The converter of claim 1, in which the switching device has a status indicator coupled to an input of the controller, and the controller takes protective action if the status indicator of the switching device does not match an expected status.

19. The converter of claim 18, in which the protective action comprises sounding an annunciator or switching off a protective circuit.

20. A method of operating an AC-DC converter having capability of controlling an upstream switching device having a power input, a power output, and a control input, the power input being coupled to and uncoupled from the power output in response to a status of the control input, the converter comprising: an AC monitor coupled to the power output of the switching device, having an output related to a quality of AC voltage on the power output of the switching device; a rectifier having an AC input coupled to the power output of the switching device, and a DC output; and a controller having an input coupled to the output of the AC monitor and an input coupled to a power on/off input; and an output coupled to the control input of the upstream switching device; the method comprising:

if the output of the AC monitor indicates a problem with the quality of the AC voltage, putting a signal on the output coupled to the control input of the switching device which causes the power output of the switching device to be uncoupled from the power input.

21. The method of claim 20 in which the converter further comprises a protective circuit having an input coupled to the DC out put of the rectifier, a control input coupled to an output of the controller, and an output controlled by the control input; a load port coupled to the output of the protective circuit, for connection of a DC load to the AC-DC converter; and in which the method further comprises if the controller determines that it is safe to connect the output of the rectifier to the load, putting a signal on the output coupled to the input of the protective circuit, such that the DC output of the rectifier is coupled to the output of the protective circuit.

22. The method of claim 21, in which the converter further comprises a filter capacitor across the output of the protective circuit, and the controller determines that it is safe to connect the output of the rectifier to the load based at least on a charging rate of the capacitor as measured by the voltage sensor.

23. The method of claim 20, in which the controller determines that it is safe to connect the output of the rectifier to the load based at least on the output of the AC monitor.

24. The method of claim 20, in which the converter further comprises a current sensor between the output of the rectifier and the load port, having an output coupled to an input on the controller and related to the current drawn through the load port, and the method further comprises putting a signal on the output coupled to the control input of the switching device which causes the power output of the switching device to be uncoupled from the power input if the current sensor detects a current in excess of a determined value.

25. The method of claim 20, in which the converter further comprises a voltage monitor coupled to the load port, having an output coupled to an input on the controller related to the DC voltage at the load port, and the method further comprises putting a signal on the output coupled to the control input of the switching device which causes the power output of the switching device to be uncoupled from the power input if the voltage monitor detects a voltage in excess of a determined value.

26. The method of claim 20, in which the converter further comprises a voltage sensor coupled to the DC output of the rectifier, having an output coupled to an input of the controller related to the voltage at the DC output of the rectifier and the method further comprises putting a signal on the output coupled to the control input of the switching device which causes the power output of the switching device to be uncoupled from the power input if the voltage sensor detects a problem in the output of the rectifier.

27. The method of claim 20, further comprising detecting a failure to disconnect the AC switching device if the controller controls the output coupled to the control input of the switching device to cause the power output of the switching device to be uncoupled from the power input, and the output of the AC monitor indicates the presence of an AC voltage at the input to the rectifier.

28. The method of claim 20, further comprising delaying turn-on of the AC switching device to prevent damage if a signal at the power on/off input is cycled too rapidly.

29. The method of claim 20 in which the converter further comprises a power-OK signal output coupled to an output of the controller, and the method further comprises asserting the power-OK signal if the controller has determined that it is safe to connect the output of the rectifier to the load and has successfully completed such connection.

30. The method of claim 26, further comprising, after receiving a power off signal on the power on/off input, de-asserting the power-OK signal and then delaying turning off the switching device for a selected time to allow a load to react to de-assertion of the power-OK signal.

31. The method of claim 20, in which the converter further comprises a safety switch coupled to an input of controller, and the method further comprises putting a signal on the output coupled to the control input of the switching device which causes the power output of the switching device to be uncoupled from the power source in response to actuation of the safety switch.

32. The method of claim 20, in which the converter further comprises an annunciator coupled to an output of the controller and the switching device further comprises a status indicator coupled to an input of the controller, and the method further comprises taking protective action if the status indicator of the switching device does not match an expected status.

33. The method of claim 32, in which the protective action comprises sounding the annunciator or switching off a protective circuit.

\* \* \* \* \*

UNITED STATES PATENT AND TRADEMARK OFFICE
CERTIFICATE OF CORRECTION

| | |
|---|---|
| PATENT NO. | : 7,911,352 B2 |
| APPLICATION NO. | : 12/273226 |
| DATED | : March 22, 2011 |
| INVENTOR(S) | : Bucella et al. |

It is certified that error appears in the above-identified patent and that said Letters Patent is hereby corrected as shown below:

Claim 8 (Column 8, line 13): delete the word "which"

Signed and Sealed this
Thirty-first Day of May, 2011

David J. Kappos
*Director of the United States Patent and Trademark Office*